United States Patent
Gurry

[15] 3,659,269
[45] Apr. 25, 1972

[54] LOGIC CIRCUIT FOR GENERATING CYCLIC SIGNALS

[72] Inventor: George W. Gurry, 2 Hamlet Close, Collier Road, Romford, England

[22] Filed: June 27, 1969

[21] Appl. No.: 837,149

[30] Foreign Application Priority Data

Mar. 31, 1969 Great Britain...................16,835/69

[52] U.S. Cl..................340/171, 340/263, 324/69, 324/78 Q, 324/69, 324/161
[51] Int. Cl.....................................H04q 9/00
[58] Field of Search..............340/171, 263; 324/69, 161, 324/78 Q, 79

[56] References Cited

UNITED STATES PATENTS

| | | | |
|---|---|---|---|
| 3,351,854 | 11/1967 | Sheen et al. | 324/79 |
| 3,441,745 | 4/1969 | Refues et al. | 340/171 |
| 3,478,317 | 11/1969 | Hales | 340/171 |
| 3,515,997 | 6/1970 | Babany | 324/79 |

OTHER PUBLICATIONS

"Measuring Frequency Deviation," R. H. Zimmerman, Electronics Industry, June 1965

*Primary Examiner*—Harold I. Pitts
*Attorney*—Delio and Montgomery

[57] ABSTRACT

Logic circuits for sensing the period of alternating input signals. An input signal is applied to a first stage of the circuit which is a generator and supplies two output signals to a second stage, which is a comparator. A first of the output signals from the generator represents the period of the input signal and a second of the signals represents a predetermined period or range of periods. These two signals are compared in the comparator, whose output is switched to a predetermined condition only if a predetermined number in succession of the first output signals each represents a period above or below the predetermined period or inside or outside the predetermined range of periods.

38 Claims, 8 Drawing Figures

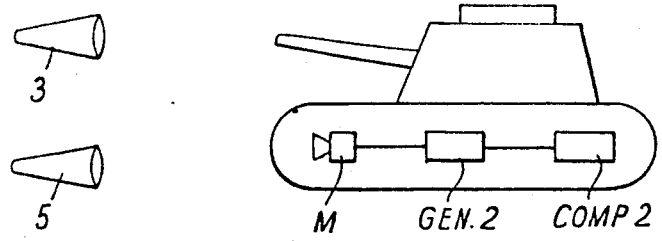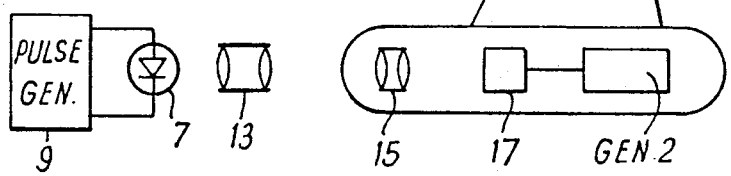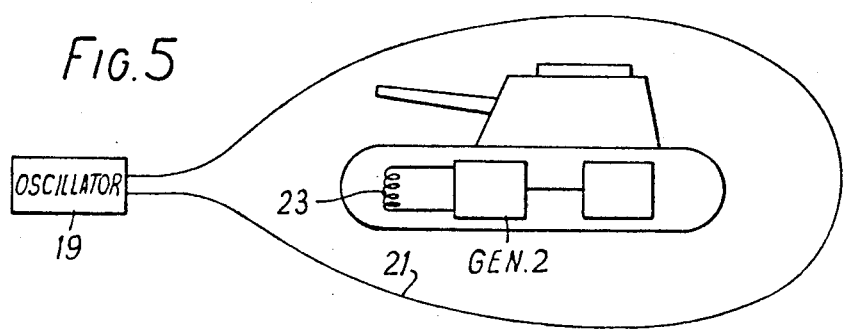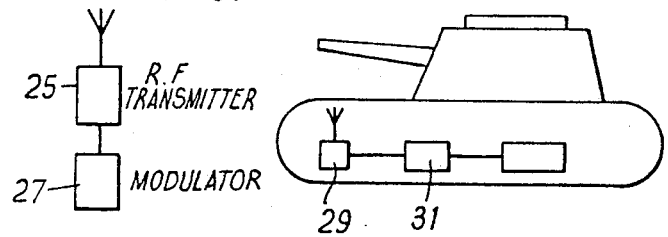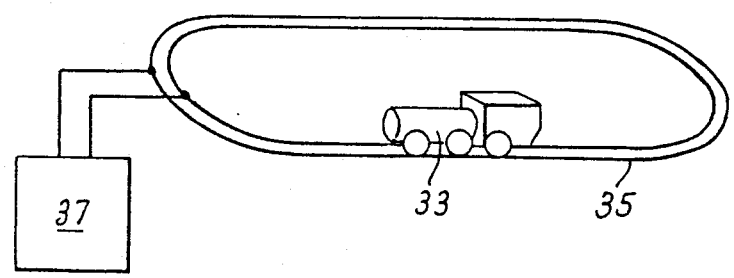

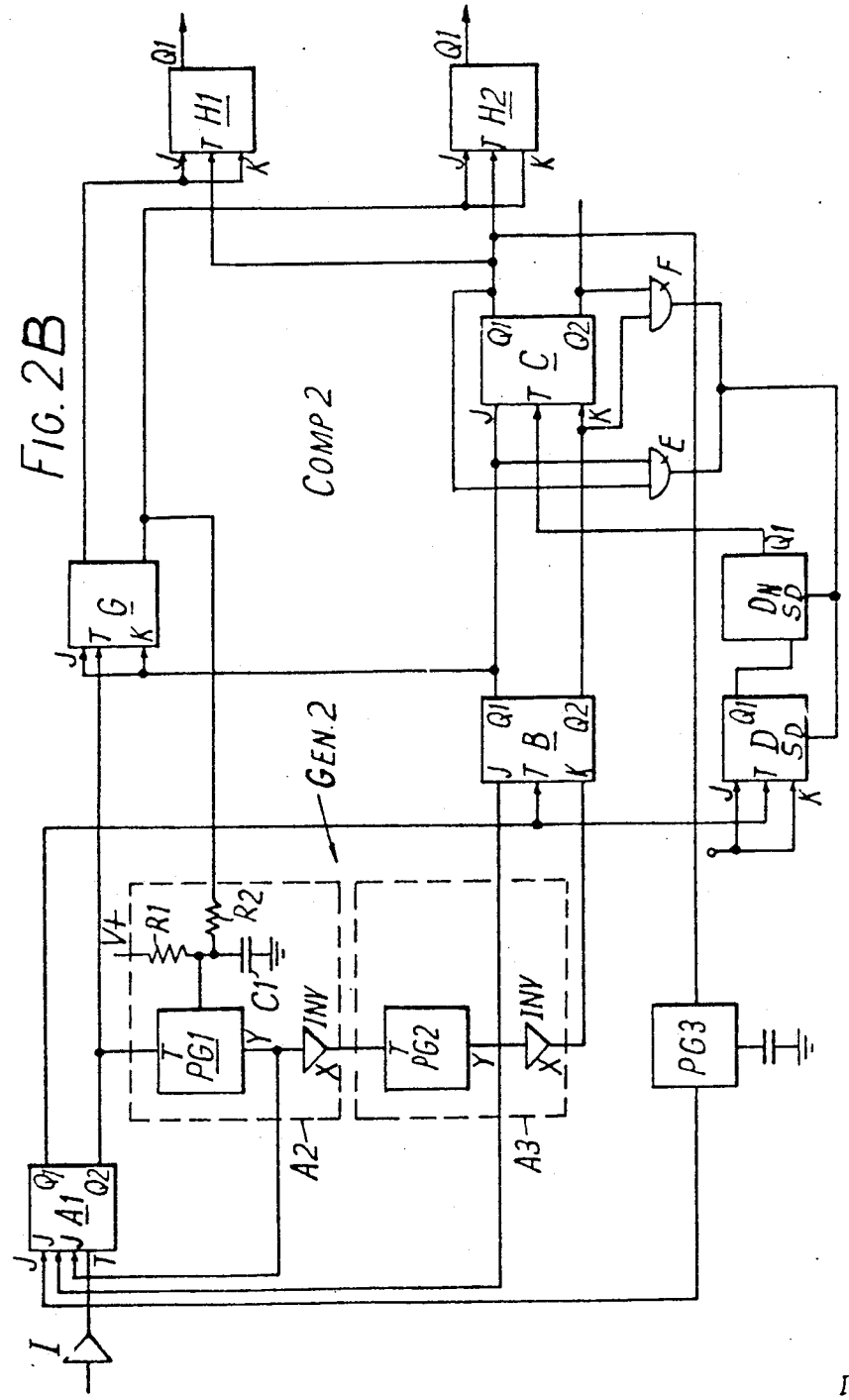

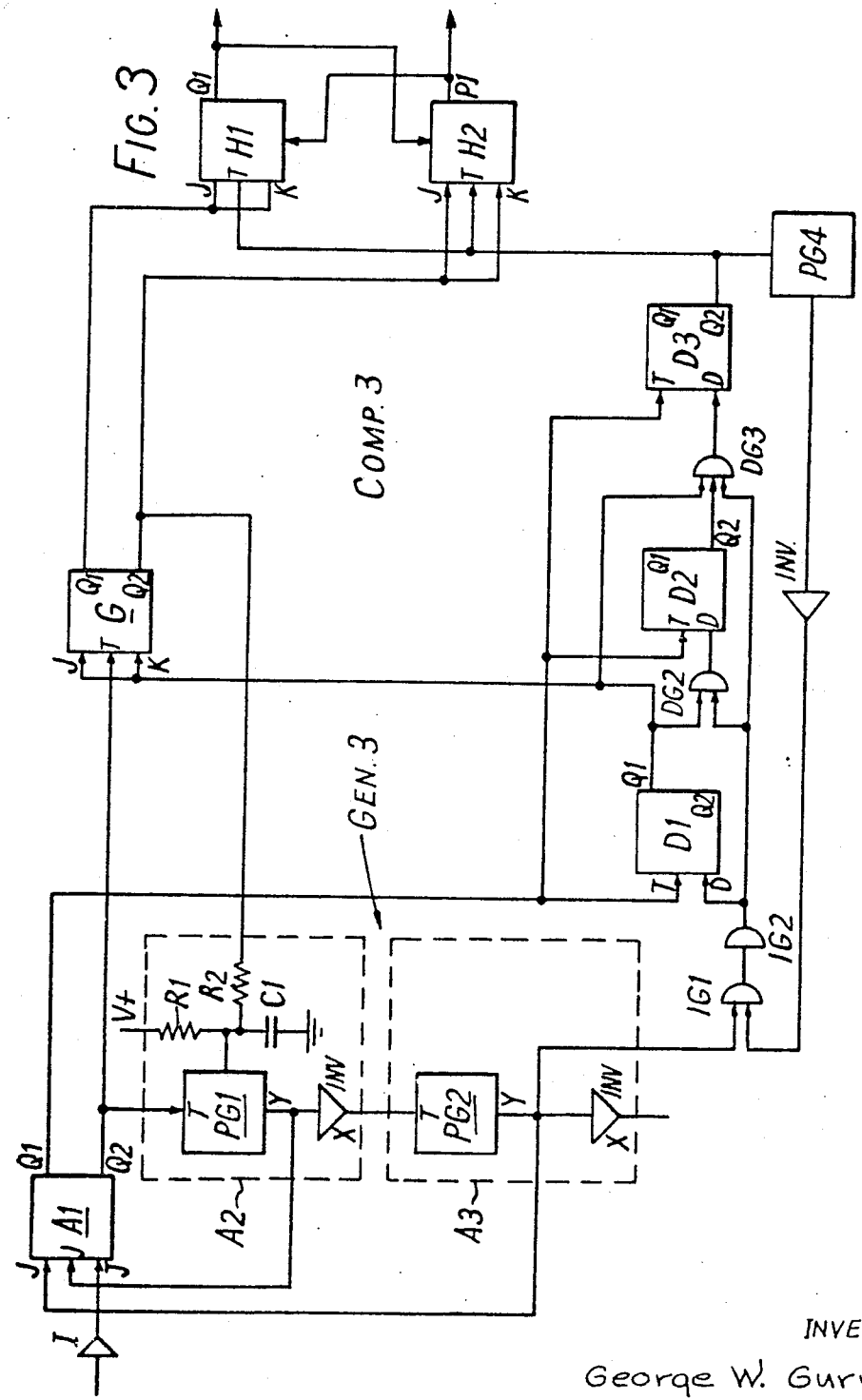

LOGIC CIRCUIT FOR GENERATING CYCLIC SIGNALS

BACKGROUND OF THE INVENTION

This invention relates to logic circuits.

Logic circuits are constructed from a series of individual circuits connected together to form a system which carries out a predetermined sequence of operations upon the application thereto of a predetermined input signal. The individual circuits within the system, may be electrical circuit means, for example, relays, electronic valves, transistors, integrated circuits, magnetic cores, etc., or they may be hydraulic valves.

Logic circuits can be employed in devices for detecting alternating input signals whose frequency lies within a predetermined range of frequencies. A typical industrial application for these devices arises from the need to control the speed of rotation of the moving parts of machinery, where the device takes the form of a transducer for generating an electrical signal of frequency corresponding to the frequency of rotation of the moving part and a detector which determines when this frequency falls within a predetermined range. Outside industry the device may be employed in toys, such as model airplanes, cars, tanks, etc., whose movements are remotely controlled by signals of predetermined frequency.

STATEMENT OF THE INVENTION

The present invention consists in a logic circuit comprising generator means adapted, upon the application thereto of an alternating input signal, to generate a pair of associated output signals at respective outputs thereof, a first of the output signals defining an interval of time representative of the period of the input signal and a second of the output signals in a pair defining a predetermined interval of time representative of a predetermined period or range of periods, comparator means, and means for applying the output signals from the generator means to the comparator means, whereby an output of the comparator means assumes a predetermined condition only after the application thereto of a predetermined number of successive pairs of output signals of which the first signal in the pair defines an interval of time bearing a predetermined relationship with the said predetermined interval of time and is therefore representative of an input signal whose period bears a predetermined relationship with the predetermined period or range of periods.

BRIEF DESCRIPTION OF THE DRAWINGS

The invention will now be described, by way of example, with reference to the accompanying drawings, in which:

FIG. 2A is a toy having a remote control device according to the invention;

FIG. 2B is an electrical circuit which forms part of the device of FIG. 2A; and

FIG. 3 is a further electrical circuit according to the invention which forms part of a device for the remote control of toys; and FIGS. 4 to 7 are further remotely controlled toys according to the invention.

Figure 1:
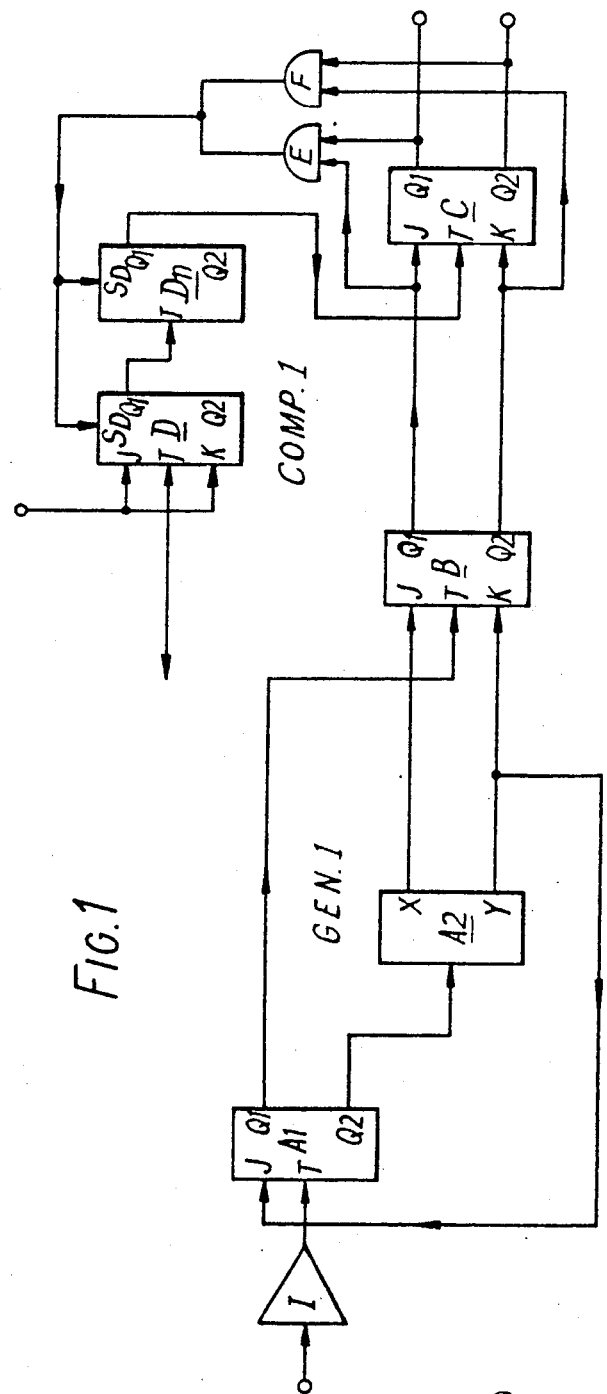
FIG. 1 is an electrical circuit according to the invention which forms part of a device for sensing the speed of rotation of a rotating shaft.

The electrical circuit shown in FIG. 1 of the drawings forms part of a device for sensing the speed of rotation of a rotating shaft and providing an output signal when the speed of the shaft rises above a predetermined value.

In this device an electrical signal having a frequency equal to the frequency of rotation of the shaft is formed by a capacitative pulse associated with the shaft. To this end the shaft is formed with a small projection which passes the probe once per revolution of the shaft and thereby causes a short change in the magnitude of the capacitance between the shaft and the probe. This change in capacitance causes an electrical pulse to be generated by an associated electrical circuit. The arrangement may, however, be such that rotation of the shaft causes generation of a voltage signal having a sinusoidal, square or other waveform whose period is equal to the period of a revolution of the shaft.

The signal from the above circuit is applied to the input of an electrical circuit according to the invention, this circuit consisting of generator means, generally designated GEN 1, and comparator means, generally designed COM 1. The individual circuits, or stages, within this circuit will now be described in general terms prior to a detailed explanation of the construction and operation of each individual circuit which appears later.

Thus, a first input stage I of the generator means GEN 1 converts the signal from the probe circuit into a train of pulses of predetermined magnitude and pulse width. The repetition frequency of the pulses is equal to the frequency of the input signal.

The output pulses from stage I of the circuit are fed to one input of a first pulse generator A1, of generator means GEN 1 which then generates two, antiphase output signals, each consisting of a train of pulses whose pulse width, or duration, equals the period of the input signal. The pulse repetition frequency of the pulse generator A1 is equal to one half of the frequency of the input signal or is maintained at a sub-multiple of that frequency, as hereinafter described.

One of the output signals from pulse generator A1 is applied to an input of a second pulse generator A2 of generator means GEN 1 and the other output signal is applied to a comparator flip-flop B of the comparator means COM 1.

Pulse generator A2 includes a standard frequency oscillator and is adapted, when supplied with an input signal from generator A1, to generate pulses whose duration, or pulse width, corresponds to a predetermined period, which in turn corresponds to the predetermined frequency which is to be detected by the device. Two antiphase output signals from the pulse generator A2 are supplied to respective inputs of the comparator B.

The comparator B has a pair of output lines respectively associated with the inputs thereof which are connected to generator A2 and the voltage on each output line is switched to a value corresponding to the voltage on the associated input at the end of each pulse from generator A1. The output voltages from comparator B are determined therefore by whether or not a pulse of predetermined duration from generator A2 has terminated before the end of the corresponding pulse from generator A1. These voltages are therefore representative of the period of the pulses from generator A1, and hence the period of the input signal from the probe, relative to the period of the standard frequency oscillator of generator A2.

It will be appreciated that the voltages generated at the outputs of comparator B are representative of the condition of the input signal from the probe circuit over one input cycle, changing in accordance with short term changes in the frequency of that signal. Further, the voltages change due to spurious changes in the frequency of the input signal, for example, changes arising from random noise voltages which may give an artificially short pulse time, i.e., a higher frequency. Finally, errors in the input stage I of the circuit cause trigger pulses to be generated at different points on successive cycles of the input signal to the circuit. If the magnitude of the errors is such that a pulse at the output of generator A1 is completed before the end of a pulse from A2 instead of afterwards as on the previous cycle, or vice versa, the outputs of comparator B change state.

To overcome these errors the output lines from comparator B are connected to respective inputs of a store C of comparator means COMP1, the store C having output lines respectively associated with these inputs thereof. Under steady-state conditions, i.e., an input signal of constant frequency, the voltage on each output line from store C corresponds to the voltage on the associated input line.

Associated with the store C are a pair of gates E and F and a counter mechanism D, $D_N$ which prevent the voltages on the outputs of store C from changing unless the voltages on the input lines have changed to a new condition and have remained in that new condition for a period of time equal to a predetermined multiple of the period of the pulses from the pulse generators A1 and A2. This prevents any change in the output from the store C when there are changes in the input due to errors in triggering the circuit or random noise voltages.

Referring now in more detail to above-described circuit, it should first be mentioned that each of the components A1, B, C, D and $D_N$ is a flip-flop constructed in the form of an integrated circuit. Such a circuit has a pair of input terminals J and K, which are respectively associated with output terminals Q1 and Q2, and a further input terminal T which is used for switching the voltages at output terminals Q1 and Q2 according to the voltages on J and K terminals. Each circuit also has SD and RD terminals respectively associated with output terminals Q1 and Q2, as hereinafter described. The circuit is operated by applying zero voltage or a positive potential to one or other input terminal, and throughout operation the Q1 and Q2 terminals are at different potentials from each other, one being at zero volts and the other at a positive potential.

The circuit can be operated in the "Toggle," "Inhibited" or "J–K" mode.

In the "Toggle" mode, positive potentials are applied to the J and K terminals, i.e., J = K = +. The application to the T terminal of a zero potential, or "0" pulse, (T = 0), causes a change in state at the Q1 and Q output terminals, one output terminal changing from a positive potential, or "+" condition, to zero potential, or "0" condition, and the other changing from the "0" condition to the "+" condition. A transition at the T terminal from zero potential to a positive potential, a + pulse, (T = +), does not affect the Q1 and Q2 voltages.

In the "Inhibited" mode, zero potential is applied to both the J and K inputs, i.e., J = K = 0. The output voltages at Q1 and Q2 now stay at their initial conditions irrespective of any changes in the potential at the T terminal.

In the "J – K" mode one of the terminals J and K is in the "0" condition and the other is in the "+" condition. Assuming that there is zero potential at J, J = 0, and a positive potential at the K terminal, K = +, and that Q1 and Q are in the "+" and "0" conditions, respectively, the application of a "0" pulse to the T terminal causes the voltages on Q1 and Q2 to reverse, i.e., Q1 = 0 and Q2 = +. Any further changes in the potential on terminal T have no effect on the Q1 and Q2 outputs. In other words, with J = 0, the first "0" pulse on T makes Q1 = 0 and Q2 = +, and the circuit stays in this condition thereafter. On the other hand, if K = 0 the first "0" pulse on T makes Q2 = 0 and Q1 = + and the circuit stays in this condition thereafter.

If zero potential is applied to either the SD or RD terminal, SD or RD = 0, the effect is to place the associated output terminal Q1 or Q2 at zero potential, irrespective of the other inputs. If SD = RD = 0, Q1 = Q2 = +.

Each of the above-mentioned gates E and F has two input terminals and a single output terminal and operates in the following manner.

Each gate is a conventional NAND/NOR gate.

If both input terminals are at a positive potential or are disconnected, the output terminal is at zero potential. If one or both input terminals is at zero potential, the output terminal is at a positive potential.

The detailed operation of the above-described circuit is as follows.

First, there is the input stage I which receives the input signal from the probe circuit and processes this signal into a form suitable for operating the first pulse generator A1. The input signal may have a varying amplitude and an unknown waveform. Accordingly, the input stage I includes, first, an amplifier which brings the amplitude of the signal to a predetermined level and, secondly, a trigger stage which converts the signal into a train of pulses. One pulse is generated at a predetermined instant during each cycle of the input signal so that the pulse repetition frequency is equal to the frequency of the incoming signal. Each pulse has a predetermined amplitude and duration and is negative-going, representing a change from a positive potential to zero potential.

The pulses from the input stage I are applied to the T input terminal of the pulse generator A1, which generates the above-mentioned, antiphase output signals, at respective Q1 and Q2 terminals thereof.

At the Q1 output the signal consists of positive, +, pulses each representing a transition from zero potential to a positive potential, while at the Q2 output there are negative going, or 0, pulses, each representing a transition from a positive potential to zero potential, Each pulse begins at the beginning of a pulse from the input stage I and ends at the beginning of the succeeding pulse from stage I, so that the width, or duration, of a pulse is equal to the duration of one cycle of the input signal. Further, assuming that the frequency of the input signal to the circuit is not too high and that there are no "0" pulses applied to the J input of the generator AL (as hereinafter described), there is one pulse at each output Q1 and Q2 of A1 for each successive pair of input pulses, i.e., the pulse repetition frequency of generator A1 is equal to one half of the repetition frequency of the incoming signal.

The pulses at the Q1 output of pulse generator A1 are applied to the T input terminal of the comparator B, which is operated in the J – K mode, as hereinafter described.

The pulses at the Q2 output terminal of pulse generator A1 are applied to an input of the pulse generator A2 and each negative going pulse results in the generation of one of the above-mentioned pulses of predetermined duration at X and Y output terminals thereof.

At the X terminal a positive or "+" pulse begins at the beginning of each negative going input pulse from generator A1 and this + pulse is applied to the J input terminal of comparator B. At the Y terminal there is a corresponding zero or "0" pulse which is applied to the K input terminal of comparator B. As mentioned above, each pulse has a predetermined duration, or pulse width, corresponding to the period of a predetermined frequency which is to be detected by the present circuit means.

The widths of the pulses from generators A1 and A2 are compared in comparator B to provide a comparison of the periods, and hence frequencies, of the incoming signal and a signal of the predetermined frequency. To effect this comparison means are provided to ensure that the T input of comparator B should receive only a single pulse from generator A1 for each pulse at its J and K inputs from generator A2.

If the frequency of the incoming signal is low so that each pulse of predetermined duration from generator A2 has been completed before the generation of a succeeding pulse by generator A1 there will be one pulse from generator A1 for each pulse from A2. If the frequency of the incoming signal is so high that a pulse from generator A2 has not finished by the time a succeeding pulse is due to be generated by A1 the repetition rate of pulses from A1 will be higher than that from A2. This occurs if the period of the input signal is less than half the period of the predetermined pulses from generator A2.

To prevent generation of two or more pulses by generator A1 during the generation of a single pulse, by generator A2, the Y output from the generator A2 is applied to the J input of generator A1 via a "harmonic suppressing" line. As indicated above, the Y output from generator A2 is a negative-going, or "0" pulse. Accordingly, the application of the pulse to the J input of generator A1 serves to ensure that once the Q1 output of that generator has been switched to the "0" condition by the ending of an input pulse from stage I it will remain in that condition throughout the duration of the pulse from A2 irrespective of the arrival of a further pulse from stage I. The Q1 output therefore remains in the "0" condition until the pulse from generator A2 has been cut-off and a succeeding pulse has been received from stage I.

As indicated above, the J input of comparator B is connected to the X output of generator A2 and is therefore supplied with "+" pulses of predetermined duration, i.e., the input voltage is positive for the duration of a pulse and zero when there is no pulse. Conversely the K input of comparator B is supplied with "0" pulses and has a zero potential for the duration of a pulse and a positive potential when the pulse is off. At the end of a "+" pulse from the Q1 output of generator A1, which is applied to the T input of comparator B, the Q1 and Q2 outputs are switched into conditions respectively corresponding to the conditions of the J and K inputs.

In other words, if the pulse of predetermined duration from generator A2 has not been completed at the end of a pulse from generator A1 the J and K inputs of comparator B are then at positive and zero potentials, respectively, and the ending of the pulse from A1 causes the Q1 and Q2 terminals of comparator B to move into, or remain in, the "+" and "0" conditions, respectively. The "0" condition on the Q2 output terminal of comparator B represents therefore an input signal of frequency higher than the predetermined frequency of generator A2.

If the pulse of predetermined duration from generator A2 has been completed before the end of a pulse from generator A1 the ending of that pulse causes the Q1 and Q2 terminals of comparator B to move into, or remain in, the "0" and "+" conditions respectively. The "0" condition on the Q1 output terminal of comparator B represents therefore an input signal of frequency lower than the predetermined frequency.

As described so far the circuit provides signals at the output of comparator B which are representative of the value of the input frequency over one input cycle, or the apparent input frequency since the true frequency may be obscured by triggering errors or random noise. The output voltages at comparator B are in fact found to vary in a random manner due to these errors due to triggering and noise.

To remove this difficulty the Q1 and Q2 output terminals of the comparator B are connected to respective J and K terminals of the store C whose output terminals Q1 and Q2 provide the final output signals of the circuit. As mentioned above, a counter mechanism D, $D_N$ and gates E and F are associated with the store C.

The gate E has one input thereof connected to the J input terminal of store C and another input connected to the output terminal Q1 of the store and the gate F likewise has the inputs thereof connected to respective terminals K and Q2.

Assuming that the voltages on the Q1 and Q2 output terminals of store C respectively correspond to the voltages on the input terminals J and K, each input of one of the gates E and F is supplied with a positive potential and each input of the other gate is maintained at zero potential. Accordingly, one of the gates has a positive potential at its output terminal and the other had zero potential at the output terminal thereof. The output terminals of the gates E and F are connected together and the zero potential on one output overrides the positive potential on the other so that the common output line is at zero potential.

If the value of the instantanous frequency of the input signal changes at any time so that the conditions of the Q1 and Q2 outputs from the comparator B are reversed, the conditions of the Q1 and Q2 outputs of store C are opposed to the conditions of respective inputs J and K. Each gate E and F now has a positive potential at one input thereof, zero potential at the other input, and a positive potential at its output terminal. The common output line from the gates E and F is therefore at a positive potential.

This common output line is connected to an SD terminal of each of the two flip-flops D and $D_N$ which form the counter mechanism of the device, connection being made in each case to the SD terminal associated with the Q1 output of the stage. Each flip-flop D and $D_N$ is operated with the J and K inputs thereto floating, the T input of flip-flop D is connected to the Q2 output terminal of generator A1 or the Y terminal of generator A2, and the T input of flip-flop $D_N$ is connected to the Q1 output of flip-flop D. The output terminal Q1 of flip-flop $D_N$ is connected to the T input terminal of store C.

Assuming that the frequency of the incoming signal is steady, so that the voltage on each output terminal of store C corresponds to the voltage on the associated input terminal, the common output line from gates E and F is at zero potential. This potential is applied to the SD terminal of flip-flops D and $D_N$ which are associated with the Q1 output terminals thereof. Its effect is to ensure that the Q1 terminals are at zero potential.

The zero potential at the Q1 output of flip-flop $D_N$ is applied to the T input of store C and has no effect on the Q1 and Q2 outputs of the store which remain in conditions respectively corresponding to the conditions of the J and K inputs.

If the frequency of the incoming signal increases from a value below the predetermined frequency to a value above that frequency, or vice versa, and stays at the new frequency for a period of several cycles, the voltages on the J and K inputs to the store C no longer correspond to the voltages on respective output terminals Q1 and Q2. Each gate E and F now has a positive potential at one input terminal thereof and zero potential at the other input terminal, and the common output line from the gates is therefore at a positive potential. Flip-flops D and $D_N$ are therefore no longer locked in the Q1 = 0 condition.

As indicated above, the T input terminal of flip-flop D is connected to the Q2 output terminal of generator A1 or the Y terminal of generator A2, each of which provides "0" pulses at the repetition frequency of the generators.

With the SD terminals of flip-flop D at a positive potential, the first "0" pulse on the T input of flip-flop D switched the Q1 output thereof to the "+" condition and the Q2 output to the "0" condition. The "+" condition on the Q1 output, which is connected to the T input of flip-flop $D_N$, has no effect on the Q1 and Q2 outputs of $D_N$. At the end of the first "0" pulse on the T input of flip-flop D there is no change in the potentials on the Q1 and Q2 outputs.

A second "0" pulse on the T input of flip-flop D reverses the potentials on the Q1 and Q2 outputs, causing a zero potential to appear on the Q1 output and a positive potential on Q2. The zero potential on the Q1 output of flip-flop D is applied to the T input of flip-flop $D_N$, reversing the potentials on the Q1 and Q2 outputs thereof so that the Q1 output, which is applied to the T input of store C, changes to a positive potential. This has no effect on the Q1 and Q2 outputs of the store C.

A third "0" pulse on the T input of flip-flop D again switches the Q1 and Q2 outputs thereof so that the Q1 output is at a positive potential and the Q2 output at zero potential. There is no change in the condition of the flip-flop $D_N$.

Finally, a fourth "0" pulse on the T input of flip-flop D switches the Q1 and Q2 outputs thereof to zero and positive potentials, respectively, and the zero potential appearing on the Q1 output of flip-flop D causes a reversal of the Q1 and Q2 outputs of flip-flop $D_N$.

The Q1 output of flip-flop $D_N$ is therefore switched to zero potential and this potential is applied to the T input of store C, switching over the potentials on the terminals Q1 and Q2 of the store so that the Q1 output corresponds to the J input and the Q2 output corresponds to the K input. In other words, the potentials on the Q1 and Q2 outputs of the store C are changed in accordance with the changed potentials on the input terminals J and K after a period of time equal to four output pulses from generators A1 and A2 has elapsed. The common outputs of gates E and F are now at zero potential and the counter mechanism is inoperative.

If there is an apparent change in frequency of the incoming signal, due to triggering errors or random noise, the potentials on the J and K inputs to the store C revert to their previous values before there have been four output pulses from the generators A1 or A2. As soon as this happens the common output line from gates E and F, hence the SD inputs to flip-flops D and $D_N$, revert to zero potential. The Q1 output of each flip-flop D and $D_N$ is therefore returned to zero potential and the above-mentioned counting sequence is terminated. The potential at the T input of store C remains at, or is switched to, zero and the Q1 and Q2 outputs of the store C therefore correspond to the J and K inputs, respectively, i.e., the Q1 and Q2 outputs remain in their initial conditions.

If there is a subsequent change in input frequency leading to a change in the J and K inputs to store C, this change must, of course, last for a time corresponding to four pulses from generators A1 and A2 before there is a change in the Q1 and Q2 outputs of store C.

In the above-described operation of the device shown in FIG. 1 the outputs Q1 and Q2 of the store C are at potentials representative of the magnitude of the input frequency relative to the magnitude of the predetermined frequency generated by the generator A2, i.e., the Q1 output is at zero potential if the input frequency is below the predetermined frequency and the Q1 output is at a positive potential if the input frequency is above the predetermined frequency.

This circuit can be modified so that a rise in frequency to a value above a predetermined value, or "trip point," prevents further operation of the circuit unless it is manually re-set.

This modification is achieved by connecting the Q2 output terminal of the store C to the J and K input terminals of the flip-flop D of the counter mechanism. If the input frequency rises above the trip point the terminal Q2 of the store is switched to zero potential and the application of this potential to the J and K inputs of flip-flop D locks the flip-flop in the "Inhibited" mode. The Q1 output of flip-flop D, the Q1 output of flip-flop $D_N$, and the T input of store C are therefore maintained at zero potential and further changes in the potentials on the output terminals Q1 and Q2 of the store C are prevented.

A further modification of the above circuit is the inclusion of means which force the output terminals Q1 and Q2 of store C into the conditions corresponding to a low input frequency if the input signals are cut-off. The means which enable this to be achieved is a gate including a transistor having an emitter electrode thereof connected to earth potential and a collector electrode connected to a source of positive potential via a resistor. The base of the transistor is connected to the positive potential via a resistor R, to inputs (a) and (b) of the gate via respective rectifiers, and to earth potential via a capacitor C.

Input (a) of the gate is connected to the Q1 output of the store C of the above circuit means and is therefore at a positive potential when the frequency of the input signal is greater than the predetermined frequency. Input (b) of the gate is connected to the Y output of generator A2 and is therefore at zero potential when generator A2 is on and at a positive potential when the generator is off.

If the frequency of the incoming signal is too high the generator A2 is on for a greater proportion of the time than it is off so that the capacitor C is connected to earth via the input (b) of the gate for a longer period than it can charge to a potential via resistor R. As the connection via input (b) presents a lower resistance discharge path than that charging path via resistor R the potential across capacitor C never rises more than a few hundred millivolts and this is not enough to cause the gate output, connected to the collector of the transistor, to fall to zero potential.

If the output terminals Q1 and Q2 on store C are in conditions corresponding to an input signal of frequency greater than the predetermined frequency and if the input signal is cut-off, the terminal (b) of the gate goes to a positive potential. The capacitor C now charges and the output terminal of the gate is modified to earth potential. This potential is applied to the SD terminal of store C which is associated with the Q1 output terminal, forcing this terminal to zero potential, which corresponds to an input frequency lower than the predetermined frequency.

FIG. 2A of the drawings shows a toy tank 1 which is provided with a device for remotely controlling forward and reverse movements of the tank. The device enables these movements to be controlled without the need for an electrical or mechanical connection between the tank 1 and an operator.

Included in the present device are generators (3 and 5) whereby an operator provides command signals for remotely controlling movement of the tank 1. Mounted on the tank 1 itself are transducer means for converting a command signal to an electrical signal of corresponding frequency, generator means, generally designated GEN 2, for producing signals respectively representative of the period of a signal from the transducer means and of a predetermined range of periods, and comparator means, generally designated COMP 2, to which the signals from generator means GEN 2 are applied, the outputs of comparator means COMP 2 assuming a predetermined condition only if a predetermined number of successive signals representing the period of the signal from generator means GEN 2 are within the predetermined range of periods.

In the present device the generators 3 and 5 are a pair of horns. One of these horns, horn 3, is designed to emit a short blast of sound at 4 Kc/s and is used for controlling forward movement of the tank and the other horn 5 emits a sound at 5 Kc/s and is used for controlling reverse movement. In either case, one blast on the horn causes movement to commence and this movement continues after the end of the blast. A second blast on the same horn brings the tank to rest.

The transducer means of the device take the form of a microphone M which converts an acoustic, command signal from a horn 3 or 5 into an electrical signal of corresponding frequency.

This electrical signal is applied to the electrical circuit shown in FIG. 2B, which forms part of the device shown in FIG. 2A and which then generates an output signal for application to a driving mechanism of the tank 1.

The electrical circuit means of FIG. 2B will now be described in general terms prior to a detailed explanation of the construction and operation of each individual circuit, which appears later. In the following description each part of the circuit of FIG. 2 which corresponds to a part of the circuit in FIG. 1 is designated by the same reference in each drawing.

Thus, a first input stage I of the generator means GEN 2 of FIG. 2B corresponds to stage I of FIG. 1 and converts an alternating electrical signal from the microphone M into a train of pulses of predetermined magnitude and pulse width. The repetition frequency of the pulses is equal to the frequency of the electrical signal.

The output pulses from stage I of the circuit means are fed to a first pulse generator A1 which corresponds to pulse generator A1 of FIG. 1 and generates two antiphase output signals, each consisting of a train of pulses whose pulse width, or duration, is equal to the period of the alternating input signal and is therefore inversely proportional to the frequency of that signal. The pulse repetition frequency of the generator A1 is equal to one half the frequency of the input signal or is maintained at a sub-multiple of that frequency, as hereinafter described.

One of the output signals from the generator A1 is applied to an input of a second generator A2, corresponding to generator A2 of FIG. 1, and to a cycling flip-flop G and the other signal is applied to a comparator flip-flop B of comparator means COMP 2.

Generator A2 includes a pulse generator PG1 having an inverter connected to an output thereof. A timing circuit of the pulse generator PG1 is connected to a first output of the cycling flip-flop G, which applies a pulse to the timing circuit during alternate pulses from the output of generator A1.

The pulse generator PG1 is a standard frequency oscillator which is adapted, when supplied with a pulse from the generator A1 and in the absence of an input pulse from the cycling flip-flop G, to generate a pulse of predetermined duration, or pulse width. This pulse duration corresponds to the period of a signal of frequency equal to 5 Kc/s. During alternate pulses from generator A1 when an input pulse is applied to the pulse generator PG1 by the flip-flop G, the duration of the pulses from PG1 is changed to a second predetermined magnitude, corresponding to the period of a signal of frequency equal to 4

Kc/s. In either event, each pulse from the pulse generator PG1 commences at the same instant as an incoming pulse from the generator A1.

Output pulses from the pulse generator PG1 are applied to the inverter, as mentioned above, and to an input of the generator A1, for controlling the frequency of that generator in the manner mentioned above.

Connected to the output of the inverter of the generator A2 is a third generator A3 which also includes a pulse generator PG2 and an inverter.

The pulse generator PG2 is a second standard frequency oscillator which is adapted to generate a pulse having a predetermined pulse width, or duration, and commencing at the end of an input pulse from the generator A2. It will be appreciated therefore that each pulse from the pulse generator PG2 extends over an interval of time which when referred to the beginning of a pulse from A2 represents a predetermined range of frequencies whose upper limit is equal to the frequency represented by the end of the corresponding pulse from generator A2. This frequency range is arranged to extend down to a frequency which is 500 c/s below the frequency represented by the end of the corresponding pulse from generator A2. Thus, when there is no pulse applied to pulse generator PG1 from the cycling flip-flop G each pulse from PG2 represents a frequency range of 4.5 to 5 Kc/s. When there is a pulse applied to pulse generator PG1 the corresponding pulse from PG2 represents a frequency range of 3.5 to 4 Kc/s.

Output pulses from the pulse generator PG2 are applied to the inverter of generator A3 and to an input of the generator A1, for controlling the frequency of that generator in the manner mentioned above.

Pulses from the output of pulse generator PG2 of generator A3 and antiphase pulses from the inverter of generator A3 are applied to respective inputs of the comparator B which, as mentioned above, is also supplied with pulses from the first generator A1. The comparator B has a pair of output terminals respectively associated with the inputs thereof which are connected to generator A3 and the voltage at each output terminal is switched to a value corresponding to the voltage on the associated input at the end of each pulse from generator A1. The output voltages from comparator B are therefore determined by whether or not there is a pulse at the output of pulse generator PG2, and the associated inverter, at the instant in time when the corresponding pulse from generator A1 is terminated. The output voltages from comparator B are therefore determined by whether or not the alternating signal at the input to the circuit means has a frequency within either of the ranges 3.5 to 4 Kc/s or 4.5 to 5 Kc/s.

As so far described the circuit means serves to determine during one cycle of an input signal, whether or not the signal has a frequency within one of the predetermined ranges of frequencies. Irrespective of whether or not the input signal is within this range of frequencies the cycling flip-flop G then switches over the timing circuit of the pulse generator PG1 so that the circuit is sensitive to frequencies within the other predetermined range during the next cycle of the input signal. This means that the outputs from comparator B would change during each cycle of an input signal within one of the predetermined frequency ranges.

To overcome this difficulty one of the outputs from comparator B is applied to two further inputs of the cycling flip-flop G. As soon as the output voltages from the comparator move to a condition corresponding to detection of a signal in one or other of the frequency ranges the cycling flip-flop G is then inhibited from effecting a further change in the timing circuit of pulse generator PG1. The duration of pulses from pulse generator PG1 is then maintained at a value corresponding to the range in question as long as there is an incoming signal within that range.

As in the case of the circuit of FIG. 1, described above, the outputs of comparator B are representative of the condition of the alternating input signal over one input cycle, changing in accordance with short term changes in the frequency of that signal.

Accordingly, the output lines from comparator B are connected to respective inputs of a store C, associated with which are a pair of gates E and F and a counter mechanism D, $D_N$.

The store C, gates E and F, and counter mechanism D, $D_N$ respectively correspond to these parts of the circuit of FIG. 1 having like references.

As so far described the circuit means provides a signal at the output of store C which is representative of an input signal having a frequency in either one of the two ranges of frequencies but there is no distinction between signals in different ranges.

To overcome this difficulty a pair of output flip-flops H1 and H2 respectively, associated with the two frequency ranges, are provided at the output of the circuit means. Each flip-flop H1 and H2 has one input thereof connected to an output from store C. In addition, output flip-flop H2 has two further inputs connected to that output of cycling flip-flop G which is connected to the timing circuit of the pulse generator PG1. Output flip-flop H1 has two further inputs thereof connected to a second output of flip-flop G, the voltage on the second output being antiphase with respect to the output voltage applied to pulse generator PG1.

Connections between the output flip-flop H1 and the cycling flip-flop G are such that the output voltages from flip-flop H1 can only be changed when flip-flop G is in a condition corresponding to operation of the pulse generator PG1 at a frequency associated with the first frequency range, 4.5 to 5 Kc/s. Accordingly, a voltage at the output of store C which corresponds to detection of an input signal in either frequency range is only able to switch the output voltage from flip-flop H1 to a condition corresponding to detection of a signal if the signal is within the first frequency range. Conversely, the output voltage from flip-flop H2 is only switched to a condition corresponding to detection of an input signal if that signal is within the second range of frequencies, 3.5 to 4 Kc/s.

Moreover, the output of flip-flop H1 or H2 is changed at the beginning of an input signal in the associated frequency range and is not affected by the termination of the input signal. To effect a further change in the output of H1 or H2 requires a signal at a frequency outside the range for a time sufficient to allow store C to re-set, followed by a further input signal of appropriate frequency. Since the outputs from H1 and H2 are applied to driving mechanisms respectively controlling forward and reverse movements of the tank 1 this means that any movement continues after the end of an input signal and is only terminated by the arrival of a fresh input signal of appropriate frequency.

Referring now in more detail to the circuit of FIG. 2B, each of the components A1, B, C, D, $D_N$, H1 and H2 is a flip-flop constructed in the form of an integrated circuit and can be operated in the "Toggle," "Inhibited" or "J – K" mode, as described in connection with FIG. 1.

Each of the above-mentioned gates E and F has two input terminals and a single output terminal and is a conventional NAND/NOR gate, as described in connection with FIG. 1.

The detailed operation of the circuit of FIG. 2B is as follows:

First, there is the input stage I which receives the input signal from the microphone and converts this signal into pulses suitable for operating the first generator A1, as described in connection with FIG. 1.

The pulses from the input stage I are applied to the T input terminal of the pulse generator A1, which generates antiphase output signals, at respective Q1 and Q2 terminals thereof, as also described in connection with FIG. 1.

The pulses at the Q1 output of pulse generator A1 are applied to the T input terminal of the comparator B, which is operated in the J – K mode, as hereinafter described. These pulses are also applied to a T input of flip-flop D of the counter mechanism.

The pulses at the Q2 output terminal of the generator A1 are applied to the T input terminals of the cycling flip-flop G and the pulse generator PG1 of generator A2.

Assuming that no inhibiting voltage is applied to the J and K terminals of the cycling flip-flop G, each negative-going or "0" pulse applied to the T input terminal of flip-flop G causes the potentials at the Q1 and Q2 outputs thereof to be reversed. Thus, if the Q1 terminal of flip-flop G is at zero potential prior to the arrival of an incoming signal it is switched to a positive potential by the first negative-going pulse from generator A1. The Q2 terminal is switched from a positive potential to zero potential. These changes take place at the beginning of the first pulse from generator A1.

The potentials of the outputs Q1 and Q2 of flip-flop G then remain at these potentials until a second "0" pulse is applied to the T input from generator A1. At the beginning of this second pulse the Q1 output of flip-flop G is switched back to zero potential and the Q2 reverts to a positive potential.

Referring now to the generator A2, the timing circuit of pulse generator PG1 includes a first resistor R1 connected in series with a capacitor C1 between a source of positive potential and earth potential. The junction between resistor R1 and capacitor C1 is connected to an active element in the generator and is also connected via a resistor R2 to the Q1 output terminal of the cycling flip-flop G.

Upon receipt of an alternating input signal the first "0" pulse at the Q2 output of generator A1 causes the generation of a "0" pulse at the Y output of the pulse generator PG1 of generator A2. This "0" pulse from PG1 begins at the beginning of the incoming pulse from generator A1 and continues for a predetermined period of time representative of a predetermined input frequency, determined by the condition of the above-mentioned timing circuit of the pulse generator PG1. Thus, during a first cycle of the alternating input signal the Q1 output of cycling flip-flop G is at a positive potential and the time constant of the timing circuit of pulse generator PG1 is therefore unaffected. The duration of the "0" pulse at the Y output of the pulse generator PG1 then corresponds to the duration of a signal having a frequency of approximately 5 Kc/s.

At the beginning of the second cycle of the alternating input signal the Q1 output of flip-flop G returns to zero potential, the time constant of the tuning circuit is increased, and the duration of the "0" pulse at the Y output terminal of pulse generator PG1 corresponds to a frequency of approximately 4 Kc/s.

At the output terminal X of the inverter of the generator A2 there appears a "+" pulse representing an inversion of each "0" pulse applied to the input thereof from pulse generator PG1.

As indicated above, the output terminal X of the generator A2 is connected to an input of a pulse generator PG2 of generator A3. At the beginning of each "+" pulse from the terminal X of generator A2 there is no change in the voltage at the output Y of the pulse generator PG2. At the end of each pulse, however, there is a negative-going change in voltage at the input to pulse generator PG2 and this causes a negative-going, or "0" pulse to appear at the Y output thereof. A corresponding "+" pulse is provided at the output terminal X of the inverter of generator A3.

Each of the pulses at the X and Y terminals of generator A3 commences at the instant in time when a pulse from the generator A2 is terminated except for small errors due to propogation delay, and each pulse has a predetermined duration corresponding to a predetermined frequency range, as mentioned above. The pulses appearing at the Y and X terminals of generator A3 are applied to respective J and K inputs of comparator B. As mentioned above, each pulse has a predetermined duration, or pulse width, corresponding to the period of a predetermined frequency which is to be detected by the present circuit means.

The comparator B serves to determine whether or not a pulse from generator A1 is terminated during the generation of a pulse by generator A3, and hence whether the incoming signal has a frequency within one of the two predetermined frequency ranges. To effect this determination the Y outputs of generators A2 and A3 are connected to respective J inputs of generator A1 so as to ensure that the T input of comparator B should receive only a single pulse from generator A1 for each pulse at its J and K inputs from generator A2. These connections operate in the manner described above for FIG. 1.

As indicated above, the J input of comparator B is connected to the Y output of generator A3 and is therefore supplied with "0" pulses of predetermined duration, i.e., the input voltage is zero for the duration of a pulse and positive when there is no pulse. Conversely the K input of comparator B is supplied with "+" pulses and has a positive potential for the duration of a pulse and a negative potential when the pulse is off. At the end of a "+" pulse from the Q1 output of generator A1, which is applied to the T input of comparator B, the Q1 and Q2 outputs of comparator B are switched into conditions respectively corresponding to the conditions of the J and K inputs.

In other words, if pulses from generator A3 are present at the J and K inputs to comparator B at the instant when a pulse from generator A1 is terminated, the J and K inputs of comparator B are then at zero and positive potentials, respectively, and the ending of the pulse from A1 causes the Q1 and Q2 terminals of comparator B to move into, or remain in, the "0" and "+" conditions respectively. The "0" condition on the Q1 output terminal of comparator B represents therefore an input signal of frequency within one or other of the predetermined range of frequencies represented by the pulses from generator A3.

If the pulse from generator A1 is terminated before the beginning or after the end of the corresponding pulses from generator A3 the ending of that pulse causes the Q1 and Q2 terminals of comparator B to move into, or remain in, the "+" and "0" conditions respectively. The "+" condition on the Q1 output terminal of comparator B represents therefore an input signal of frequency outside the predetermined range of frequencies.

As mentioned above, one of the outputs of the comparator B, the Q1 output, is connected to a pair of inputs of the cycling flip-flop G, the J and K inputs. Also when an input signal having a frequency within either of the predetermined ranges is applied to the circuit the Q1 output of comparator is switched to zero potential, the "0" condition. Accordingly, in the presence of such an input signal the cycling flip-flop G is switched to the inhibited mode and the outputs Q1 and Q2 thereof are not affected by subsequent changes in the potential on the T input. This means that the timing circuit of pulse generator PG1, which is connected to the Q1 output of flip-flop G, is maintained in a condition corresponding to the frequency range in which the frequency of the incoming signal lies. The timing circuit remains in this condition until the incoming signal is "outband," whereupon the Q1 output of comparator B reverts to the "+" condition and the flip-flop G is free to change the condition of the timing circuit of pulse generator PG1 on each alternate cycle of an incoming signal, as described above.

As so far described the circuit provides signals at the outputs of comparator B which are representative of the value of the input frequency over one input cycle, or the apparent input frequency since the true frequency may be obscured by triggering errors or random noise.

As mentioned above, this difficulty is overcome by providing the comparator means COMP 2 consisting of the store C, gates E and F and a counter mechanism D, $D_N$ at the output of comparator B. This part of the circuit operates in the manner described above in connection with FIG. 1.

As so far described the output voltages from store C are the same for an input signal in either one of the two predetermined ranges of frequency. As mentioned above, a distinction between the two ranges is provided by connecting output flip-flops H1 and H2 to the output of store C.

Thus, output flip-flop H1 has the T input thereof connected to the Q1 output of store C and its J and K inputs connected to the Q2 output of cycling flip-flop G. Output flip-flop H2 has its T input connected to the Q1 output of store C and its J and K inputs connected to the Q1 output of cycling flip-flop G. Each of the flip-flops H1 and H2 has Q1 and Q2 outputs respectively associated with the J and K inputs thereof. The Q1 output of flip-flop H1 is applied to the drive mechanism which provides forward movement of the tank and the Q1 output of flip-flop H2 is applied to the drive mechanism responsible for reverse movement.

In the normal condition of the circuit means, i.e., when the tank is at rest, the Q1 outputs of flip-flops H1 and H2 are in the "+" condition.

When an incoming signal in either of the predetermined ranges of frequencies is received from the microphone the Q1 output of comparator B is switched to the "0" condition and cycling flip-flop G is switched to the inhibited mode, as described above.

Assuming that the incoming signal has a frequency in the range 4.5 to 5 Kc/s the Q1 output of cycling flip-flop G is in the "+" condition when the signal is detected, and the output flip-flop H2, which has its J and K inputs connected to the Q1 output of flip-flop G, is in the "Toggle" mode. The Q2 output of cycling flip-flop G is in the "0" condition and the output flip-flop H1, which has its J and K inputs connected to Q2 output of flip-flop G is in the "Inhibited" mode. Accordingly, the "0" pulse which appears at the Q1 output of store C is able to switch the outputs of the output flip-flop H2, changing the voltage on the Q1 output from the "+" to the "0" condition, but has no effect on the flip-flop H1, whose Q1 output remains in the "+" condition. Switching the Q1 output of output flip-flop H2 to the "0" condition actuates the drive mechanism for reverse movement of the tank.

At the end of the signal within the frequency range 4.5 to 5 Kc/s the Q1 output of store C and hence the T inputs of flip-flops H1 and H2 remain in the "0" condition. In practice the end of a signal within a frequency range is followed by a signal outside the range, either deliberately or due to random noise, and the Q1 output of store C reverts to the "+" condition. This change has no effect on the Q1 outputs of flip-flops H1 and H2 and the tank therefore continues its reverse movement. The output of comparator B has returned to the "+" condition so that the inhibiting voltages are removed from cycling flip-flop G.

Assuming now that a second signal of frequency within the range 4.5 to 5 Kc/s is applied to the circuit from the microphone the cycling flip-flop G and output flip-flop H1 are again switched to the inhibited mode and the output flip-flop H2 is switched to the "Toggle" mode. Accordingly, the "0" pulse appearing at the Q1 output of store C again reverses the Q1 and Q2 outputs of the flip-flop H2, the Q1 output changing to the "+" condition and thereby switching off the reverse drive mechanism of the tank.

Assuming now that an incoming signal has a frequency within the range 3.5 to 4 Kc/s the Q1 output of the cycling flip-flop G is in the "0" condition when the signal is detected and the Q2 output is in the "+" condition. Accordingly, the output flip-flop H2 is now in the "Inhibited" mode and the flip-flop H1 in the "Toggle" mode. A first signal within the range 3.5 to 4 Kc/s therefore switches the Q1 output of output flip-flop H1 to the "0" condition, which activates the forward drive mechanism of the tank. After an incoming signal outside the range has returned the Q1 output of the store C to the "+" condition a second signal within this range returns the Q1 output of store C to the "0" condition, whereupon the Q1 output of H1 is switched to the "+" condition and the drive mechanism is deactivated.

When the present remote control means is used in a small room, reflections from the walls, ceiling, etc., may give rise to antiphase acoustic signals at the microphone on the tank. These antiphase signals cause temporary reductions in the amplitude of the command signal received by the microphone M, and during any one of these reductions the microphone may pick up a random noise signal whose amplitude is greater than the amplitude of the reduced command signal. The electrical signal provided at the output of the microphone M and applied to the frequency sensing means is therefore changed from an "inband" signal to an "outband" signal, causing the outputs of comparator B to be switched.

As so far described the outputs of store C would also change from the "inband" conditions if the reduction in amplitude persists for four or more cycles of the signals applied to Comparator B. When the command signal received by the microphone returns to its previous amplitude the effect would be the same as the application of a second command signal, i.e., the output from flip-flop H1 or H2 would change and the tank would stop if it was already moving or begins to move if it was stationary.

To overcome this difficulty the present control means includes a further pulse generator PG3 having an input thereof connected to the Q1 output of store C, which is connected to flip-flop H1 and H2, and an output connected to a further J input of generator A1. Pulse generator PG3 includes a standard frequency oscillator which is adapted, when supplied with an input "0" pulse, to generate an output "0" pulse of duration greater than the normal duration of a blast from the horns 3 and 5.

In operation of the present control means, detection of a command signal whose frequency lies in either of the above-mentioned ranges and whose duration is such as to provide four successive "inband" signals form Generator A1 causes the Q1 output of store C to move to the "0" condition. Pulse generator PG3 therefore supplies an "0" pulse to the further J input of generator A1, and the Q1 output of generator A1 is thereby maintained in the "0" condition for the duration of the pulse, irrespective of any change in the signal applied to the generator from input stage I.

As indicated above, the duration of the "0" pulse from pulse generator PG3 is greater than the normal duration of a blast from one of the horns 3 and 5, so that the blast is terminated before the pulse ends. There is then no danger of a concluding part of an interrupted command signal producing the same effect as the application of a second command signal.

At the end of the "0" pulse the further J input of generator A1 reverts to the "+" condition and the circuit is ready to receive a further command signal.

Suitably, the longest duration of a blast from a horn 3 or 5 is approximately 0.25 seconds and the "0" pulse from pulse generator PG3 has a duration of 0.3 to 0.5 seconds.

It will be appreciated that the generator A3 provides a frequency range or bandwidth of 500 c/s whether the circuit means is sensing a frequency of approximately 3 Kc/s or 4 Kc/s. To provide a bandwidth which is a fixed percentage of the frequency sensed it is merely necessary to connect the Q1 output of the cycling flip-flop G to the timing circuit of pulse generator PG2 as well as to the timing circuit of PG1. The standard frequency of pulse generator PG2 and hence the duration of pulses from the generator, is then changed during alternate cycles, in similar manner to the changes in pulse duration of pulse generator PG1. In the result, for a 10 percent variation in duration of the pulses from pulse generator PG2 the above-mentioned predetermined frequency ranges become 3.6 to 4 Kc/s and 4.5 to 5 Kc/s.

It will also be appreciated that the circuit can be modified to provide a further output voltage for controlling some other movement of the tank 1, for example, rotation of the turret. This involves extending the capacity of the cycling flip-flop G by providing an additional bi-stable element, G2, driven by one of the outputs from G, so that four unique states of the Q1 and Q2 outputs of G and G2 are obtained. Suitable gating circuits are provided at the outputs of G and G2 to sequentially connect different resistors across the capacitor C1 of PG1, thereby allowing for up to four different pulse durations from PG1. These could be 1, 2, 3 and 4 Kc/s. Two further output flip-flops H3 and H4 are provided to take advantage of the increased number of frequency ranges, together with additional gating means to ensure that only one output flip-flop is in the "Toggle" condition at any time.

Finally, it should be noted that a predetermined time duration, occurring a predetermined interval of time after commencement of a pulse from the generator A1, can be defined by means other than the above-described cascade arrangement of pulse generators A2 and A3. For example, the generators A2 and A3 could be replaced by two generators A4 and A5 each of which generates a pulse commencing at the commencement of a pulse from generator A1 the pulses from generator A4 being of different duration from the duration of pulses from generator A5. The pulses from generators A4 and A5 are fed to a suitable comparator which produced a predetermined output signal if each pulse from generator A1 occurs during the time within which a pulse from one of the generators A4 and A5 has terminated and a pulse from the other is still being generated.

The circuit shown in FIG. 3 of the drawings forms part of a further device for controlling the forward and reverse movements of a toy tank and is a modification of the device described with reference to FIGS. 2A and 2B.

Included in the present device are a pair of horns (not shown) for an operator of the device, and a microphone (not shown) which is mounted on the tank and converts an acoustic, command signal from a horn into an electrical signal of corresponding frequency.

The electrical signal is applied to generator means GEN 3 containing an input stage I, a generator A1 of a first pulse generator means, and generators A2 and A3 and a cycling flip-flop G of a second pulse generator means. The generator means GEN 3 corresponds to, and functions in the same manner as, the generator means GEN 2 of FIG. 2.

In the present circuit the pulses from the generator A1 and the pulse generator PG2 of generator means GEN 3 are fed to comparator means COMP 3, which replace the comparator means COMP 2 of the circuit shown in FIG. 2 of the drawings. The comparator means COMP 3 are formed of three counting stages D1, D2 and D3 connected together in sequence, data gates DG2 and DG3 respectively associated with the stages D2 and D3, and input gates IG1 and IG2.

Each of the counter stages D1, D2 and D3 of the comparator means COMP 3 is a flip-flop constructed in the form of an integrated circuit and having a data input D, a trigger input T, and two outputs Q1 and Q2. The two outputs Q1 and Q2 are always at different potentials, one being at zero potential, the "0" condition, and the other at a positive potential, the "+" condition. The data input D can be supplied with a zero potential, a "0" pulse, or a positive potential, a "+" pulse, as can the trigger input T.

In operation, the application of a "+" pulse to the trigger input T has not effect upon the potentials at the outputs Q1 and Q2. Likewise, the application of a "0" pulse to the trigger input T has no effect if the output Q1 is in the same condition as the data input D. If the output Q1 is not in the same condition as the data input D, however, the application of a "0" pulse to the trigger input T causes the output Q1 to be switched to a voltage corresponding to that at the input D, this change being accompanied by a switching of the output Q2. Thus, if data input D is in the "0" condition and outputs Q1 and Q2 are in the "+" and "0" condition, respectively, the application of a "0" pulse to the trigger input T switches Q1 to the "0" condition and Q2 to the "+" condition.

Each of the data gates DG2 and DG3 and the input gates IG1 and IG2 has a single output and a series of inputs, any one or more of which can be electrically connected into the circuit. If an input is not connected into the circuit it assumes the "0" condition.

In operation, the output of each gate assumes the "+" condition if each input is in the "0" condition. If any one or more of the inputs are in the "+" condition the output of the gate assumes the "0" condition.

In the present circuit the Q1 output of the generator A1 is connected to the trigger input T of each of the counter stages D1, D2 and D3. The Y output of the generator A2 is connected to one input of the input gate IG1 and the output of this gate is connected to an input of the gate IG2. The output of gate IG2 is connected to the data input D of the counter stage D1, one input of data gate DG2, and one input of data gate DG3. A second input of the data gate DG2 is connected to the Q1 output of counter stage D1 while second and third inputs to data gate DG3 are respectively connected the Q2 output of stage D2 and the Q1 output of stage D1.

The J and K inputs of cycling flip-flop G, which were connected to the Q1 output of comparator B in FIG. 2 are connected to the Q1 output of counter stage D1.

Connected to the Q2 output of the final counter stage D3 are gating means consisting of two output flip-flops H1 and H2. These flip-flops H1 and H2 are of the form described in connection with FIG. 2, each having J, K and T inputs and Q1 and Q2 outputs. In the present circuit the T input of each output flip-flop H1 and H2 is connected to the Q2 output of counter stage D3 and the J and K inputs of each output flip-flop are connected to the cycling flip-flop G in the manner described above, i.e., the J and K inputs to H1 are connected to the Q2 output of flip-flop G and the J and K inputs to H2 are connected to the Q1 output of flip-flop G.

In addition to these connections each of the output flip-flops H1 and H2 is provided with a further input, the further input of flip-flop H1 being connected to the Q1 output of H2 and the further input of H2 being connected to the Q1 output of H1. The purpose of these further connections to H1 and H2 is hereinafter described.

In the present circuit the lock-out pulse generator PG3 of FIG. 2B is replaced by a lock-out pulse generator PG4. Pulse generator PG4 has an input connected to the Q2 output of the final counter stage D3 and an output connected via an inverter to a second input of the input gate IG1. Included in the pulse generator PG4 is a standard frequency oscillator which, when a "0" pulse is applied to an input of the generator, provides a "0" pulse of extended duration at the output thereof. The duration of this output "0" pulse is greater than the normal duration of a blast from the horns. The action of this extended "0" pulse is hereinafter described.

When there is no alternating input signal applied to the present circuit the Q1 output of generator A1 is in the "0" condition and the Y output of pulse generator PG2 is in the "+" condition, as described in connection with FIG. 2. The trigger input T of each counter stage D1, D2 and D3 is therefore in the "0" condition. The output of input gate IG1 is in the "0" condition so that the output of gate IG2, the data input D of stage D1 and the first input of data gates D2 and D3 are in the "+" condition. Assuming that the Q1 output of stage D1 is in the "+" condition, the data input D and the Q1 output of stage D2 are in the "0" condition, the Q2 output of stage D2 is in the "+" condition, the data input D and the Q1 output of stage D3 are in the "0" condition, and the Q2 output of stage D3 are in the "+" condition.

Assuming now that the operator provides a blast on one of the horns the resulting alternating input signal from the microphone on the tank is applied to the generator A1 via the input stage I and results in the above-mentioned pulses at the Q1 output of generator A1 and the Y output of pulse generator PG2. At the Q1 output of A1 there is a positive pulse which commences at the beginning of the first cycle of the alternating input signal and ends at the end of the cycle. At the Y output of the pulse generator PG2 there is a "0" pulse which commences a predetermined interval of time after commencement of the pulse from generator A1 and has a predetermined duration. This "0" pulse from pulse generator PG2 switches the output of input gate IG1 to the "+" condition, whereupon the output of gate IG2, and hence the data input D of counter stage D1, and the first inputs of data gates DG2 and DG3 are switched to the "0" condition. The outputs of data gates DG2 and DG3 remain in the "0" condition owing to the "+" condition of their remaining inputs.

As the alternating input signal from the microphone is within one or other of the predetermined frequency ranges, determined by pulse generators PG1 and PG2 of generator A2, the "+" pulse from the Q1 output of generator A1 is terminated while the "0" pulse is present at the Y output of pulse generator PG2. Termination of this "+" pulse from generator A1 is equivalent to the application of a "0" pulse to the trigger input T of each counter stage D1, D2 and D3. The Q1 output of stage D1 is therefore switched to the "0" condition, corresponding to the condition of its data input D, and the Q2 output of this stage moves into the "+" condition. The second input of data gate DG1 and the third input of data gate DG2 move to the "0" condition. There are no changes at the outputs of stages D2 and D3 since the Q1 output of each of these stages already corresponded to the condition of the data input D thereof at the instant in time when the "0" pulses was applied from generator A1.

At the end of the "0" pulse from pulse generator PG2 the data input D of stage D1 and the first input of each data DG2 and DG3 reverts to the "+" condition.

During the second cycle of the alternating input signal the Q1 output of generator A1 remains in the "0" condition. At the beginning of the third cycle the Q1 output of A1 is switched to the "+" condition which has no effect on counter stages D1, D2 and D3, and the Q2 output of the generator A1 switches to the "0" condition. A second pulse of predetermined pulse duration is therefore generated by pulse generator PG2 a predetermined interval of time after the beginning of the "+" pulse at the Q1 output of generator A1. This second "0" pulse is applied to the data input D of stage D1 and the first input of data gates DG1 and DG2. Since each input to data gate DG1 is now in the "0" condition the output of the gate, and hence the data input D of the stage D2 move to the "+" condition. The output of data gate DG3 remains in the "0" condition since the Q2 output of stage D2, and hence the second input to gate DG3, is in the "+" condition.

At the end of the third cycle of the alternating input signal the resulting "0" pulse from generator A1 has no effect on the outputs of stages D1 and D3 but switches the Q1 output of stage D2 to the "+" condition, corresponding to the condition of its data input D, and the Q2 output of stage D2 to the "0" condition. The output of data gate DG3 moves to the "+" condition but this condition is not transferred to the Q1 output of the stage since the switching of the trigger input T thereof to the "0" condition has already taken place.

The end of the second "0" pulse from the pulse generator PG2 has no effect on the counter stages D1, D2 and D3 and neither does the beginning of a further "+" pulse at the Q1 output of generator A1, which occurs at the end of the fourth cycle of the alternating input signal. During the fifth cycle of the input signal there is a third "0" pulse at the Y output of generator PG2 and this is applied to the data input of stage D1 and the first inputs of data gates DG2 and DG3, as described above.

At the end of the fifth cycle a third "0" pulse appears at the Q1 output of generator A1 and is applied to the trigger input T of each counter stage D1, D2 and D3. This "0" pulse has no effect on stages D1 and D2, since the condition of the Q1 output of each of these stages already corresponds to the condition of the data input thereof. At the stage D3, however, the beginning of the "0" pulse has the effect of switching the Q1 output to the "+" condition and the Q2 output to the "0" condition.

The effect of the five successive cycles of an alternating input signal having a frequency within one of the predetermined frequency ranges determined by generator A2 is to switch the Q2 output of the third and final counter stage D3 to the "0" condition. This Q2 output of stage D3 is applied to the T input of output flip-flops H1 and H2 as mentioned above. The Q1 output of one or other of these flip-flops H1 and H2, determined by which flip-flop is maintained in the "Toggle" mode by cycling flip-flop G and which is in the "Inhibited" mode, is therefore switched to the "0" condition, as described in connection with FIG. 2. This operates the driving mechanism and causes the tank to move in the forward or reverse direction, dependent upon which horn has been used and which output flip-flop H1 or H2 has been activated.

As explained in the description of FIG. 2, the Q1 output of H1 or H2 remains in the "0" condition after the termination of a blast from the corresponding horn and the switching of the T input thereof back to the "+" condition. To switch the output back to the "+" condition, and hence stop the movement of the tank, it is necessary to switch the T input to the flip-flop back to the "0" condition by a second blast.

There may, however, be temporary interruptions in a blast during which the microphone may pick up signals outside the predetermined frequency ranges, and these may have the effect of switching the T input of flip-flops H1 and H2 to the "+" condition. Continuation of the blast switches the T inputs back to the "0" condition and stops the movement.

To overcome this difficulty there is provided the lock-out generator PG4 as mentioned above.

As soon as the Q2 output of counter stage D3 is switched to the "0" condition the output generator PG4 is likewise switched to the "0" condition, for the above-mentioned extended period of time. While the output generator PG4 is in the "0" condition the output of the inverter associated with the generator and hence the second input to the input gate IG1, is in the "+" condition. This means that the data input of counter stage D1 and the first input to each data gate DG2 and DG3 are in the "+" condition and remain in this condition irrespective of whether or not there is a "0" pulse at the Y output of pulse generator PG2. The data inputs D to stages D2 and D3 are in the "0" condition. Accordingly, as soon as any succeeding "0" pulse is supplied from generator A1 the counter stages D1, D2 and D3 are switched to the above-mentioned starting condition and remain in this condition until the end of the extended period determined by pulse generator PG4.

If an alternating input signal outside one of the predetermined frequency ranges is received immediately after one cycle of a signal within one of the ranges, or two successive cycles within one of the ranges, the counter stages D1, D2 and D3 are returned to the starting condition in the following manner.

The alternating input signal outside a predetermined frequency range results in a "0" pulse from generator A1 which commences when there is no "0" pulse at the Y output of pulse generator PG2. The data input D of stage D1 is therefore in the "+" condition, as are the first inputs of data gates DG2 and DG3. The data inputs of stages D2 and D3 are therefore in the "0" condition. In these circumstances a "0" pulse from generator A1, which is applied to the T input of each stage, switches the Q1 output of stage D1 to the "+" condition and the Q1 outputs of D2 and D3 to the "0" condition, which is the above-mentioned starting condition.

The purpose of the above-mentioned coupling together of the output flip-flops H1 and H2 is to prevent both driving mechanisms in the tank, respectively associated with H1 and H2, from being operated at the same time. Each further input of flip-flops H1 and H2 is therefore designed so that the application of a "0" pulse switches the Q1 output of that flip-flop to the "+" condition.

Thus, when a predetermined number of cycles of an alternating signal within one of the predetermined frequency ranges has been applied to the circuit the Q1 output of the output flip-flop associated with that range, say H1, is in the "0" condition and the associated driving mechanism in the tank is activated. If a predetermined number of successive cycles in the other predetermined range of frequencies are now applied to the circuit the Q1 output of flip-flop H2 is switched to the "0" condition. This activates the other driving mechanism and at the same time causes the Q1 output of the cycling flip-flop H1 to be switched to the "+" condition switching off the driving mechanism associated with flip-flop H1.

In other words, the Q1 outputs of H1 and H2 can both be in the "+" condition, in which case both driving mechanisms are switched off. On the other hand, only one of the flip-flops H1 and H2 can have its Q1 output in the "0" condition at any time, and the flip-flop H1 or H2 whose output is in the "0" condition is the one associated with the range of frequencies within which the alternating signal last received by the circuit lies.

The circuit shown in FIG. 2B includes a lock-out pulse generator PG3 which, when the output of comparator means COMP 2 assumes an "inband" condition, maintains the output in this condition for a predetermined time. In the circuit of FIG. 3 there is a lock-out pulse generator PG4 which, when the output of comparator means COMP 3 assumes an "inband" condition, causes the output to be switched to the "outband" condition by the next pulse from generator A2 and to remain in the "outband" condition for a predetermined time. A lock-out generator operating in the manner of PG3 could be employed in the circuits of FIGS. 1 and 3 and a lock-out generator corresponding to PG4 could be employed in the circuits of FIGS. 1 and 2B.

An alternative form of lock-out generator for any of the above-described circuits is one which, upon the comparator means assuming "inband" condition, immediately switches the output to the "outband" condition for a predetermined time. A further lock-out generator which can be used in any of the above circuits maintains the output of the comparator means in the "inband" condition for a predetermined time and then switches to output to the "outband" condition.

In use of any of the above devices the detection of an alternating input signal having a period above or below a predetermined period, or within a predetermined range of periods, is used to effect a switching operation in some control mechanism at the output of the circuit. If there is a slight, cyclic variation in the frequency of the alternating input signal so that its period varies between values just above and just below the predetermined period, or inside and outside the predetermined range of periods, the control mechanism is switched on and off.

To avoid this a circuit having no lock-out generator or a lock-out generator corresponding to that employed in FIG. 2B, can be provided with a "differential line" which couples the output of the comparator means to the generator A2 of the generator means. When the output of the comparator means assumes a condition corresponding to detection of an "inband" signal the resulting change in potential on the differential line changes the timing constant of the generator A2. This changes the predetermined period, or range of periods, to which the circuit is sensitive, the change being in such a sense and of sufficient magnitude to maintain the output of the comparator means in the "inband" condition.

In each of the above circuits a generator A1 provides a pulse whose duration is equal to the period of the alternating input signal. The circuit could be re-designed, however, to operate with higher input frequencies by including frequency divider circuits in generator A1. Generator A1 could be designed to generate pulses whose duration is equal to a predetermined fraction of the period of the input signal. Clearly, the essential feature of generator A1 is that it should provide a pulse whose duration is representative of the input period.

In modifications of the above circuits the generator A1 is replaced by a generator which generates a different form of signal which defines an interval of time representative of the period of the input signal. For example, a generator could be employed which generates an output which is a differential of the output from generator A1, i.e., two voltage "blips" or "-transients" spaced by an interval of time representing the period of the input signal. Comparison between the time defined by the signal from this generator and the generator A2, or generators A2 and A3, is then effected in comparator means similar to the comparator means COMP 1, COMP 2 and COMP 3 above.

The generators A2 and A3 could likewise be replaced by other forms of generator which produce an output signal in the form of voltage blips or transients spaced by a predetermined interval of time representing a predetermined period or range of periods.

In a modified form of the devices shown in FIGS. 2A and 2B and 3, which is also suitable for remotely controlling movement of a toy tank, the horns are replaced by ultrasonic generators. In a further device for use in controlling movement of a toy boat the horns are replaced by crystal vibrators which are immersed in water and the microphone is arranged on the hull of the boat so as to receive acoustic signals transmitted through the water.

A second form of device, shown in FIG. 4, employs a source of modulated infra-red radiation as the generator means and an infra-red detector as the transducer means on the toy.

In this device the source of infra-red radiation is a gallium-arsenide diode 7 connected across the output terminals of an electrical pulse generator 9. Electrical pulses which are up to 6 amps in magnitude and approximately 6 $\mu$secs in duration are applied to the diode 7 by the generator 9 at a repetition rate between 2 and 12 Kc/s.

Pulses of infra-red radiation from the diode 7 are projected towards the toy in the form of a slightly diverting beam by a condensing lens system 13. Mounted on the toy is a similar lens system 15 for focussing the radiation on to an infra-red sensitive cell 17 which serves an infra-red detector.

In a third form of device, shown in FIG. 5, the generator means is an electrical oscillator 19 whose output winding is a loop 21 of wire embracing a large area of floor space within which the toy is to be moved. The oscillator 19 generates electrical signals at a frequency between 4 and 12 Kc/s in the loop 21, which has an impedance of approximately 1 ohm.

The loop 21 of the present generator means serves as a primary winding of a transformer whose secondary winding is a coil 23 mounted on the toy and electromagnetically coupled to the loop 21. This coil 23 serves as the transducer means of the device, converting the electrical command signals in the loop 21 into electrical signals which are applied to the frequency sensing means of the device.

In a fourth form of device shown in FIG. 6, the generator means comprise a radio frequency transmitter 25 and a modulator 27 which modulates the output from transmitter at a frequency between 2 and 10 Kc/s. The transducer on the toy comprises a radio frequency receiver 29 and a de-modulator 31.

Finally, FIG. 7 shows a the device for use in controlling a toy car or railway engine 33 which runs on or over a conducting rail 35, to, which a generator 37 supplies an alternating electrical signal to a logic circuit on the toy via the conducting rail 35.

The circuits described above can be used in the remote control of a driving mechanism or of a further electrical circuit on a toy, model or plaything.

I claim:

1. A logic circuit comprising generator means adapted, upon the application thereto of an alternating input signal, to generate a pair of associated first and second repetitive output signals at respective first and second outputs thereof, the first of the output signals in a pair defining an interval of time representative of the period of the alternating input signal and the second of the output signals in a pair defining a predetermined interval of time representative of a predetermined period or range of periods, comparator means, and means for applying the output signals from the generator means to the comparator means, said comparator means providing an output signal responsive to said first and second output signals which assumes a predetermined condition only after the application thereto of a predetermined number of successive pairs of said first and second output signals where the interval of time defined in the first output signal bears a predetermined relationship with the said predetermined interval of time whereby said comparator output signal is representative of an alternating input signal whose period bears a predetermined relationship with the predetermined period or range of periods.

2. A logic circuit as claimed in claim 1, wherein the comparator means comprise a comparator to which the output signals from the generator means are applied, the comparator being adapted to generate a predetermined output signal upon the application thereto of one pair of output signals from the generator means of which the first signal in the pair is representative of an input signal whose period bears the said predetermined relationship with the said predetermined period or range of periods, storage means for applying the predetermined signal from the comparator to a first input of said storage means, means for effecting a comparison between the signal at the first input of the storage means and an output signal thereof and generating an error signal representative of a difference between the signals, counter means, means for applying the error signal to a first input of said counter means, means for applying to a second input of the counter means a signal of frequency having a predetermined relationship with the frequency of the alternating input signal, the counter means being adapted to generate a control signal after the application of the error signal thereto for a continuous period within which the generating means provide a predetermined number of the said successive pairs of output signals and means for applying the control signal to a second input of the storage means, whereby there is generated at the said output of the said storage means an output signal corresponding to the signal at the first input thereof.

3. A logic circuit as claimed in claim 2, wherein the counter means comprise a bi-stable device having an output terminal at which the output voltage changes only upon a change in a predetermined sense of a voltage applied to an input terminal thereof whereby the frequency of changes in the output voltage is equal to one half the frequency of changes in the input voltage, the output of the device being connected to the said second input of the storage means and the output voltage of the device serving as the said control signal.

4. A logic circuit as claimed in claim 3, wherein the counter means comprise a plurality of the said bi-stable devices connected together in sequence so that an output voltage of each device changes at one half the frequency of changes in the output voltage of the preceding device.

5. A logic circuit as claimed in claim 2, wherein the means for generating an error signal comprise gating means having a pair of inputs respectively connected to the first input and to the output of the storage means and an output connected to a control terminal of each stage in the counter means, a difference between the signals at the said first input and the output of the store causing an error signal at the output of the gating means which enables generating of a control signal by the counter means.

6. A logic circuit as claimed in claim 1, wherein the comparator means comprise counter means including a plurality of counter stages, equal in number to the said predetermined number, connected together in sequence and each having a data input, a trigger input and an output, means are provided for applying each of the first output signals from the generator means to the trigger input of each counter stage, means are provided for applying each of the second output signals to the data input of the first counter stage, and means are provided for applying the output of each preceding counter stage to the data input of each counter stage after the first stage in the sequence, the output of a counter stage only assuming a predetermined condition after the application to the trigger input thereof of successive first input signals from the generator means, equal in number to the order of the stage in the sequence, each of which represents an alternating input signal whose period bears the predetermined relationship with the predetermined period or range of periods.

7. A logic circuit as claimed in claim 6, wherein there is associated with each counter stage after the first stage in the sequence a data gate, each data gate having an output thereof connected to the data input of the associated counter stage, a first input thereof to which the second output signal in each pair is applied, and a further input, or further inputs, connected to the preceding stage, or to respective preceding stages, the output of each gate assuming a predetermined data condition when there is a second output signal of a pair applied to the first input thereof and each of the of the further input thereto is in the said predetermined condition.

8. A logic circuit as claimed in claim 1, wherein the output of the said comparator means is adapted to switch from the predetermined condition upon the application to the comparator means of a single one of the first output signals from the generator means which is representative of an input signal whose period does not bear the predetermined relationship with the predetermined period or range of periods.

9. A logic circuit as claimed in claim 1, wherein the output of the comparator means is adapted to switch from the predetermined condition only upon the application thereto of a predetermined number of successive pairs of output signals from the generator means in each of which the first output signal is representative of an input signal whose period does not bear the predetermined relationship with the said predetermined period or range of periods.

10. A logic circuit as claimed in claim 1, wherein the comparator means include lock-out means adapted, when the output of the comparator means assumes the said predetermined condition, to prevent switching from the said predetermined condition for a predetermined time.

11. A logic circuit as claimed in claim 1, wherein the comparator means include lock-out means adapted, when the output of the comparator means assumes the said predetermined condition, to actuate the comparator means so that the output thereof is switched from the predetermined condition and is so maintained for the said predetermined time.

12. A logic circuit as claimed in claim 1, wherein the comparator means include lock-out means adapted, when the output of the comparator means assumes the said predetermined condition, to maintain the output in the predetermined condition for a predetermined time and then to switch the output from the predetermined condition.

13. A logic circuit as claimed in claim 1, wherein the comparator means include lock-out means adapted, when the output of the comparator means assumes the said predetermined condition and is subsequently switched from the said condition, to prevent return switching to the said condition for a predetermined time.

14. A logic circuit as claimed in claim 1, comprising means coupling the output of the comparator means to the generator means, whereby upon the output of the comparator means assuming the predetermined condition the second output signal of each pair subsequently generated by the generator means is representative of a period or range of periods different from the said predetermined period or range of periods.

15. A logic circuit as claimed in claim 1, comprising means for maintaining the repetition frequency of the first output signals generated by the generator means equal to the repetition frequency of the second output signals generated thereby, whereby the generator means are prevented, after termination of a first output signal of a pair, from generating a further one of the first output signals prior to the termination of an associated second output signal.

16. A logic circuit as claimed in claim 1, wherein each of the first output signals from the generator means is a pulse whose duration is representative of the period of the alternating input signal.

17. A logic circuit as claimed in claim 1, wherein each of the second output signal is a pulse whose duration is representative of the predetermined period or range of periods.

18. A logic circuit as claimed in claim 1, wherein the generator means comprise first and second pulse generator means, the alternating input signal is applied to the first pulse generator means, whereby the first pulse generator means generate the said first output signals, and means are provided for applying the first output signals from the first pulse generator means to the second pulse generator means, whereby the second pulse generator means generate pulses each of which commences at the commencement of a corresponding output signal from the first pulse generator means and has a predetermined pulse duration representative of a predetermined period.

19. A logic circuit as claimed in claim 1, wherein the generator means comprise first and second pulse generator means, the alternating input signal is applied to the first pulse means, whereby the first pulse generator means generate the said first output signals, means are provided for applying the first output signals from the first pulse generator means to the second pulse generator means, the output of the second pulse generator means adapted to assume a predetermined condition for a predetermined duration of time commencing a predetermined interval of time after the commencement of a corresponding output signal from the first pulse generator means and representing a predetermined range of periods.

20. A logic circuit as claimed in claim 19, wherein the second pulse generator means include a first pulse generator adapted to generate pulses of a first predetermined pulse duration, each pulse commencing at the commencement of an output signal from the first pulse generator means, a second pulse generator, and means for applying the pulses from the first pulse generator to the second pulse generator, the second pulse generator being adapted, upon the application thereto of pulses from the first to generate pulses of a second predetermined duration, each pulse from the second pulse generator commencing at the termination of a pulse from the first pulse generator.

21. A logic circuit as claimed in claim 19, wherein the second pulse generator means are adapted to generate a plurality of trains of pulses, each pulse in a train of pulses commencing a predetermined interval of time, associated with that train, after the commencement of a corresponding output signal from the first pulse generator means, and the output of the comparator means assumes the said predetermined condition upon the application thereto of a predetermined number of successive output signals from the first pulse generator means which are each terminated at a time bearing a predetermined relationship with the interval of time defined by the duration of a pulse from the second generator means and are therefore representative of an alternating input signal having a predetermined relationship with any one or more of a plurality of predetermined ranges of periods.

22. A logic circuit as claimed in claim 21, wherein the said trains of pulses are generated at a common output of the second pulse generator means.

23. A logic circuit as claimed in claim 21, wherein there is a predetermined sequence of pulses from respective trains generated at the output of the second pulse generator.

24. A logic circuit as claimed in claim 19, wherein the second pulse generator means include a first pulse generator adapted to generate pulses at the commencement of an output signal from the first pulse generator means, a second pulse generator, and means for applying pulses from the first pulse generator to the second pulse generator, the second pulse generator being adapted upon the application thereto of pulses from the first pulse generator to generate pulses of the said predetermined duration, each pulse from the second pulse generator commencing at the termination of a pulse from the first pulse generator, and means are provided for varying the pulse duration of pulses generated by the first pulse generator.

25. A logic circuit as claimed in claim 24, wherein the means for varying the pulse duration of pulses generated by the first pulse generator include a cycling device having an output thereof coupled to a timing circuit of the first pulse generator and an input coupled to an output of the first pulse generator means, whereby the output signal applied to the timing circuit, and hence the duration of the pulse generated by the first pulse generator, changes at the commencement of each output pulse from the first pulse generator means.

26. A logic circuit as claimed in claim 21, wherein means are provided for varying the pulse duration of pulses generated by the second pulse generator so that the ratio of the duration of a pulse from the second pulse generator to the duration of a pulse from the first pulse generator is substantially constant.

27. A logic circuit as claimed in claim 21, wherein means couple the comparator means to the second pulse generator means and are adapted, upon the application to the input of the comparator means of an output signal from the first pulse generator means which is terminated at a time bearing a predetermined relationship with the duration of a pulse in a first train of pulses from the second pulse generator means, to ensure that the succeeding pulse generated by the second pulse generator means is also in the said first train.

28. A logic circuit as claimed in claim 27, comprising a plurality of output gates respectively associated with the predetermined ranges of periods, means coupling the output of the comparator means to a first input of each gate, and means for applying to a second input of each gate a control signal from the second pulse generator means, a predetermined output signal being provided at the output of a gate when the pulse from the second pulse generator corresponds to the range of periods associated with that gate and the output of the comparator means assumes the predetermined condition.

29. A logic circuit as claimed in claim 28, wherein the output gates are arranged in pairs, and the output of each output gate is coupled to a further input of the other gate in the same pair, the commencement of a predetermined output signal at the output of one gate in a pair when there is a predetermined output signal at the output of the other gate in the pair causing termination of the said signal at the output of the said other gate.

30. A logic circuit as claimed in claim 1, wherein means coupling the generator means to the comparator means are adapted to switch the output of the comparator means from the predetermined condition upon the termination of the alternating input signal.

31. Remote control means comprising means for generating an alternating command signal having a frequency equal to a predetermined frequency or within a predetermined range of frequencies, transducer means adapted upon receipt of an alternating signal, to generate an alternating electrical input signal of frequency representing the frequency of the command signal, and a logic circuit as claimed in claim 1, the input of the said logic circuit being coupled to the output of the transducer means.

32. Remote control means as claimed in claim 31, wherein the command signal generator means comprise a source of acoustic signals adapted to generate signals at audio or ultrasonic frequencies and the transducer means comprise an acousto-electrical transducer.

33. Remote control means as claimed in claim 31, wherein the command signal generator means comprise a source of infra-red radiation, and means for modulating at a predetermined frequency radiation emitted by the said source, and the transducer means comprise an infra-red detector.

34. Remote control means as claimed in claim 31, wherein the command signal generator means comprise an electrical oscillator adapted to generate electrical signals of the said predetermined frequency or within the predetermined range of frequencies in an output circuit thereof which comprises an extended loop, and the transducer means comprise an electrical winding electromagnetically coupled to the said loop.

35. Remote control means as claimed in claim 31, wherein the command signal generator means comprise radio frequency transmitter means and means for modulating the said transmitter means at a frequency equal to the said predetermined frequency or within the said predetermined range of frequencies, and the transducer means comprise radio frequency receiver means and means for de-modulating a command signal received by the receiver means.

36. Remote control means comprising a source of alternating electrical command signals and a logic circuit according to claim 1, the input of the logic circuit being electrically connected to the output of the source.

37. A remotely controlled toy, model or plaything which includes a logic circuit as claimed in claim 1.

38. A remotely controlled toy, model or plaything which includes remote control means as claimed in claim 21.

* * * * *